Aug. 1, 1967
L. P. HOPKINS
3,333,350
ARITHMETIC TEACHING APPARATUS
Filed Aug. 5, 1965
2 Sheets-Sheet 2
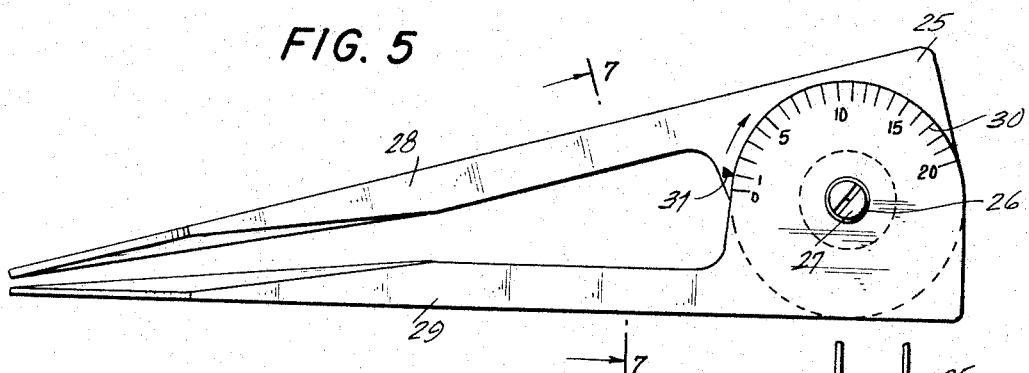
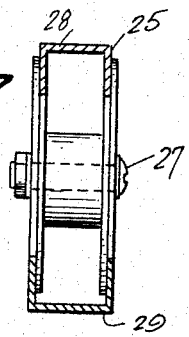
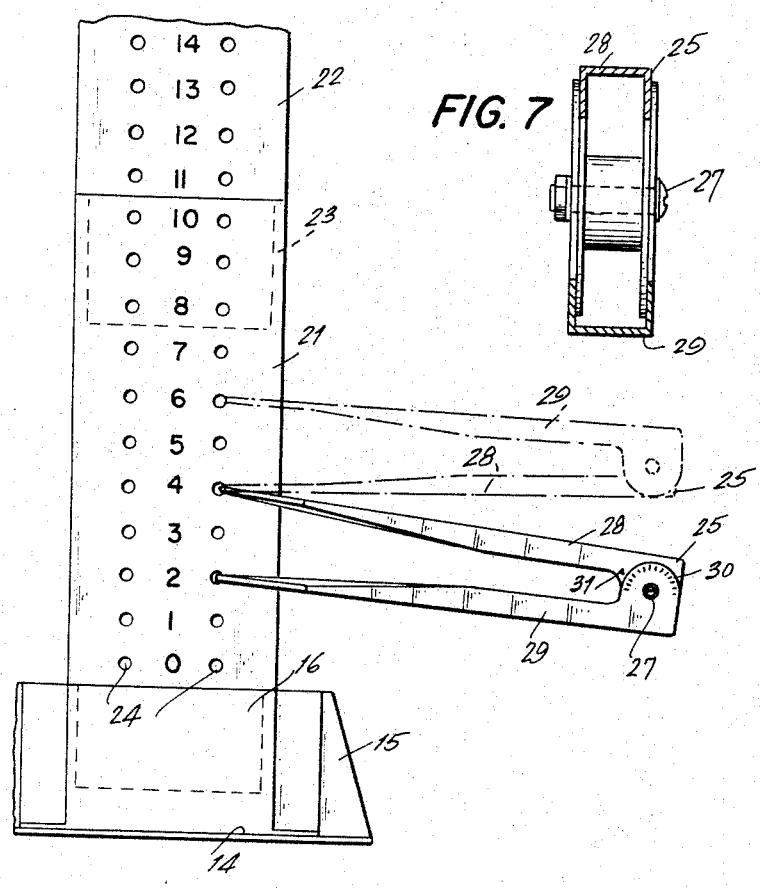
INVENTOR.
LIONEL P. HOPKINS
BY
ATTORNEY

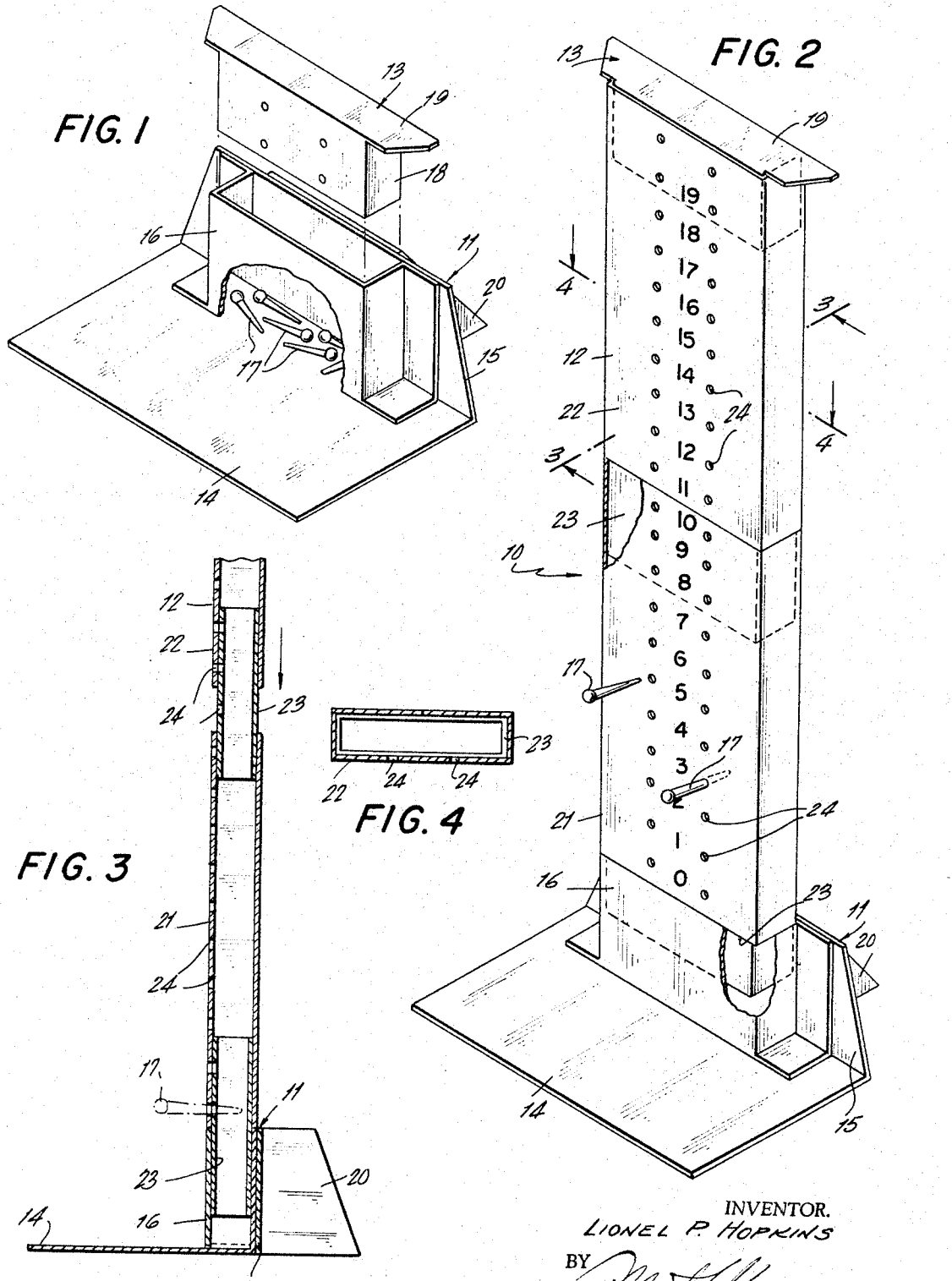

United States Patent Office 3,333,350
Patented Aug. 1, 1967

3,333,350
ARITHMETIC TEACHING APPARATUS
Lionel P. Hopkins, 96 New England Ave.,
Summit, N.J. 07901
Filed Aug. 5, 1965, Ser. No. 477,484
5 Claims. (Cl. 35—31)

This invention relates to teaching devices and more particularly to a device useful in instructing small children in arithmetic.

Where it is desired to convey the elementary concepts of arithmetic to small children and particularly to mentally retarded children, it is often necessary to stimulate several senses at the same time in order to create a lasting impression. The simple concept of more, less, up, down, dividing and subtracting, etc. can best be taught by means of visual aids. These devices employ the physical structure of the aid to supplement the mental concept being taught.

Accordingly, it is an object of the present invention to provide a teaching device useful for the teaching of arithmetic which will be simple in operation, and useful for a wide variety of arithmetic concepts.

Another object of the present invention is to provide an inexpensive teaching device which is highly portable, light in weight, and can be used repeatedly.

A further object of the present invention is to provide a teaching device which can be handled by the child in exploring simple arithmetic concepts.

A further object of the present invention is to provide a teaching device which lends itself to use in a class of several pupils.

A feature of the present invention is its simple box-like construction which lends itself to economical mass production.

Another feature of the present invention is its use of easily handled pegs to indicate numerical values.

Another feature of the present invention is its use of a simple compass for measuring numerical and linear distances.

Still another feature of the present invention is its use of a simple scale on the measuring compass for setting the compass to any desired numerical reading.

A still further feature of the present invention is its telescopic structure whereby additional sets of numbers may be added as the child's comprehension grows.

The invention consists of the construction, combination and arrangement of parts, as herein illustrated, described and claimed.

In the accompanying drawings, forming a part hereof, there is illustrated one form of embodiment of the invention, in which drawings similar reference characters designate corresponding parts, and in which:

FIGURE 1 is a somewhat isometric view, partially broken away, of a base and cover member, made in accordance with the present invention.

FIGURE 2 is somewhat isometric view, partially broken away, of a complete embodiment of the present invention.

FIGURE 3 is a cross-sectional view taken on line 3—3 in FIGURE 2, looking in the direction of the arrows.

FIGURE 4 is a cross-sectional view taken on line 4—4 in FIGURE 2, looking in the direction of the arrows.

FIGURE 5 is a top plan view of a compass used in the present invention.

FIGURE 6 is a fragmentary view in elevation illustrating the manner in which the teaching device is employed.

FIGURE 7 is a cross-sectional view taken on line 7—7 of FIGURE 5.

FIGURE 8 is a view in side elevation of the compass shown in FIGURE 5.

Referring to the drawings, and particularly to FIGURES 1 and 2, 10 indicates a teaching device for instructing pupils in arithmetic consisting of a base 11, a measuring column 12, and a cover member 13. The device may be made of cardboard, heavy paper and the like, although it will be apparent that other suitable materials may be substituted without departing from the spirit of the present invention.

The base, as best shown in FIGURE 1, consists of a horizontal platform 14, having a vertically disposed rear portion 15 thereon. A box-like receptacle 16, is secured to the front face of the rear portion 15, and the upper surface of the platform 14 as by gluing, bonding, or the like. The receptacle 16 is adapted to hold a plurality of small pegs 17, the use of which is hereinafter more fully described. When the teaching device is not in use, the pegs 17 are placed within the receptacle 16 and the cover member 13 slid within the upper portion of the receptacle 16, to retain the pegs therein.

It will be observed that the cover member 13 consists of a rectangular sleeve-like portion 18, the top of which is closed by a horizontal member 19. The sleeve-like portion 18 of the cover member 13 is of a size which will permit it to telescope within the box-like receptacle 16.

Additional supporting ears 20 may be secured to the back face of the rear portion 15 of the base 14, in the manner shown in FIGURES 1, 2 and 3. The ears 20 may be swingably attached to the rear portion 15 for storage purposes. Thus, when additional stability is desired, the ears may be swung outwardly in the position shown in FIGURE 3, to increase the size of the base platform 14. When the greater stability is not required, the ears 20 can be folded against the rear portion 15, so as to occupy a minimum of space.

One or more rectangular hollow measuring members 21, 22, best shown in FIGURE 2, complete the major member of the measuring device. The measuring members are provided with reduced portions 23 at one end thereof so that they can be telescopically fitted together and also inserted into the box-like receptacle 16, of the base 11, as shown in FIGURE 2. The measuring members 21 are provided with a series of pairs of spaced holes 24, which are of a size such that they will receive the pegs 17, therein. The spaced holes are numbered from one to ten on one measuring member, and successive measuring members may be added to increase the numbers available for teaching purposes.

The remaining element of the teaching device according to the present invention, consists of a compass 25, best shown in FIGURES 5, 6, 7 and 8. The compass, too, may be made of heavy paper, cardboard, or the like, and is jointed at 26, and secured together by a screw 27. The arms 28, 29, of the compass may be separated or brought together about the screw 27, in the usual manner of compass operation. One of the arms 29, is provided with a scale 30, consisting of numbers from one to twenty or more and the opposite arm 28 is provided with a witness mark 31, by means of which the arms of the compass may be set at any desired interval.

Referring to FIGURE 6, it will be seen that the compass 25, is used to measure out arithmetic intervals upon the measuring members 21, 22. The child thus relates the numbers to the spaces, their location upon the measuring members and the distance between the arms of the compass.

The operation or use of the teaching device herein illustrated, is as follows:

To illustrate addition, a number is indicated by one of the pegs 17. The number to be added is counted up from the indicated number and a second peg inserted in the last hole. The number next to the second peg indicates the sum. The concept of quantity can be illustrated by placing indicators along side each number up to the first number in the addition, then adding indicators or pegs equivalent to the number to be added. The highest number being the sum or the total number of pegs. This operation incorporates the concept of quantity into simple addition.

In using the compass 25, the student can set the arms 28, 29, apart a distance equal to the distance from zero to the number which is to be added. A peg can be inserted in the hole at that point. The compass can then be set for the additional distance of the number to be added to the first number. The number opposite the upper end of the compass is the sum.

It will be apparent that subtraction can also be taught on this device either by removing pegs from the holes or by using the compass to measure down the desired interval of the number to be subtracted.

In teaching multiplication, a peg is placed in an opening opposite the number selected as the multiplier. The compass is then set for the distance from zero to the multiplier. The multiplicand is then used to count off the number of intervals up from zero. The number at which the upper end of the compass comes to rest indicates the result of the multiplication. Division can be accomplished in a similar manner by stepping down from the number being divided until the lower prong of the compass comes to rest opposite the correct answer.

It will be apparent that the herein described device is simple to operate, versatile in its teaching possibilities, and inexpensive in structure. It permits the teacher to sound the name of the number, point to the visual appearance of the number, and provide the child with physical elements in the form of pins and compasses, whereby a firm association can be established.

Having thus fully described the invention, what is claimed as new and desired to be secured by Letters Patent of the United States, is:

1. A teaching device comprising in combination a base, a hollow rectangular receptacle vertically disposed upon the base and secured thereto, an elongated rectangular measuring column telescopically received at its lower end within the receptacle and extending upwardly therefrom, a plurality of numbered pairs of spaced openings longitudinally disposed within the column, a plurality of pins receivable within the openings and a compass, arms on said compass, and a pivot to swingably secure the arms at one end whereby the free ends of the compass arms may be adjusted to any desired interval between the spaced openings in the column.

2. A teaching device comprising in combination a base, a hollow rectangular receptacle vertically disposed upon the base and secured thereto, an elongated rectangular measuring column telescopically received at its lower end within the receptacle and extending upwardly therefrom, a plurality of numbered pairs of spaced openings longitudinally disposed within the column, a plurality of pins receivable within the openings, a cover member consisting of a rectangular box-like body portion and a horizontally disposed top portion said box-like body being of a size which will telescope within the receptacle, and a compass, arms on said compass, and a pivot to swingably secure the arms at one end whereby the free ends of the compass arms may be adjusted to any desired interval between the spaced openings in the column.

3. A device according to claim 1 in which the base comprises a horizontal portion, a vertically disposed rear portion and ears swingably secured to the rear portion whereby the base may be increased in size.

4. A device according to claim 2 in which one of the compass arms is provided with a scale and the other arm has a witness mark thereon whereby the distance between the free ends of the arms can be pre-set.

5. A teaching device comprising in combination a base, a hollow rectangular receptacle vertically disposed upon the base and secured thereto, an elongated rectangular measuring column telescopically received at its lower end within the receptacle and extending upwardly therefrom, a plurality of numbered pairs of spaced openings longitudinally disposed within the column, a second measuring column telescopically received at its lower end within the top of the first column, a plurality of spaced pairs of numbered openings in the second column, a plurality of pins receivable within the openings and a compass, arms on said compass, and a pivot to swingably secure the arms at one end whereby the free ends of the compass arms may be adjusted to any desired interval between the spaced openings in the column.

References Cited

UNITED STATES PATENTS

| | | | |
|---|---|---|---|
| 1,841,912 | 1/1932 | Pierce. | |
| 2,486,260 | 10/1949 | Church | 35—73 X |
| 2,514,636 | 7/1950 | Glaze | 35—31.4 |
| 2,695,462 | 11/1954 | Gilbert | 35—31.4 |

EUGENE R. CAPOZIO, *Primary Examiner.*

W. GRIEB, *Assistant Examiner.*